United States Patent [19]
Petersen et al.

[11] 3,843,832
[45] Oct. 22, 1974

[54] CAPACITANCE PROBE

[75] Inventors: Oscar J. Petersen, Orange; Henry A. Cetola, Yorba Linda, both of Calif.

[73] Assignee: Robertshaw Controls Company, Richmond, Va.

[22] Filed: Apr. 4, 1973

[21] Appl. No.: 347,924

[52] U.S. Cl. .............................. 174/151, 317/246
[51] Int. Cl. ..................... H01g 7/00, H01b 17/26
[58] Field of Search .................. 174/151 C, 152 R; 73/304 C; 317/246; 324/61 P; 340/244 C

[56] References Cited
UNITED STATES PATENTS

| | | | |
|---|---|---|---|
| 2,315,492 | 4/1943 | Anderson et al. | 174/151 |
| 2,651,672 | 9/1953 | Ivanoff | 174/152 R |
| 2,955,466 | 10/1960 | Coles | 73/304 C X |
| 3,109,882 | 11/1963 | Maltby | 174/151 |
| 3,226,474 | 12/1965 | Garnett et al. | 174/151 |
| 3,352,963 | 11/1967 | Homrig | 174/151 |
| 3,748,551 | 7/1973 | Petersen | 317/246 |

*Primary Examiner*—Laramie E. Askin
*Attorney, Agent, or Firm*—Fulwider, Patton, Rieber, Lee & Utecht

[57] ABSTRACT

A capacitance probe for passing a center conductor into a sealed container including a shoulder washer engaging the conductor intermediate the ends thereof and insulative washers sandwiching the shoulder washer between a press fit compression plug and a gland fitting threadably inserted into the wall of the container. The center conductor is enclosed by insulative shields, distal of the insulative washers, where the shields are sealed by wedge seals conformed to mate with respective sealing surfaces in the fitting and plug upon compression. In a second embodiment, the compression fitting is bonded to a seal at the lower end thereof and the shoulder washer is pressed into position in the compression fitting by a retainer.

10 Claims, 5 Drawing Figures

PATENTED OCT 22 1974

CAPACITANCE PROBE

BACKGROUND OF THE INVENTION

1. Field of the Invention

The present invention relates to capacitance probes, and more particularly to insulators forming hermetic seals between concentric conductive members.

2. Description of the Prior Art

In the art of electrical measurement equipment, and particularly in measurement equipment designed to detect the liquid level in closed containers, the use of capacitance probes has had very frequent application. Use of capacitance probes for liquid level detection is particularly convenient since a continuous or linear change in capacitance can be made out corresponding to changes in liquid level. Such liquid level sensing capacitance probes typically include a first conductor disposed vertically in the liquid, forming one plate of a capacitor connected to one side of a detection circuit, where the second conductor or plate of the capacitor is formed either by the walls of the container, or by the liquid itself.

In particular, for measurements of levels of conductive liquids, the change in capacitance is formed by the effective change in plate size formed by the liquid where the liquid forms the second plate of the capacitor. In this application it is necessary to separate the two plates, or the conductor and the liquid, from each other and generally such separation is accomplished by enclosing the first conductor by an insulator of known dielectric strength and thickness. Furthermore, the first conductor must always be separated from the walls of the container which form the return conductor from the other plate of the capacitor, thus requiring feed-through insulators to separate at installation of the first conductor from the container. Such remote sensing of a liquid level is usually required in applications where the extremes in temperature or pressure are not compatible with direct reading. Accordingly, the feed-through insulator must also serve as a seal to contain pressurized gases and the like, and therefore must be of a material capable of deforming or flowing to fill voids and imperfections in the mating surfaces. Furthermore, since the first conductor is suspended directly from the feed-through seal, the seal must be able to transmit all the static and dynamic loads of the conductor as well as the thermal stresses generated by various changes in temperature within and across the container. Accordingly, the seal is necessarily formed from deformable insulating materials of the inert type, most usually materials like Teflon. Heretofore, such feed-through insulators directly absorbed all the load of the first conductor, being further deformed by creep or cold flow due to continual stresses to a point where leakages eventually occur. Also, most of the prior art assemblies with such feed-through seals incorporate cooperating threaded members for compressing the seal into sealing position at installation such that sealing contact is further degraded by the installation procedure involving large torsional loads during assembly.

SUMMARY OF THE INVENTION

Accordingly, it is the general purpose and object of the present invention to provide a capacitance probe which would also serve as a seal against high pressure and which is axially compressed into sealing engagement by a compression plug in mating cooperation with a gland fitting.

Another object of the present invention is to provide a feed-through seal compressed into sealing position in a fitting by load transfer means directly coupled to pass probe stresses through the fitting surfaces.

These and other objects are accomplished within the present invention by providing a tubular center conductor concentrically swaged to a common shoulder washer sandwiched between two insulating washers axially compressed at installation in a fitting. The exposed probe extending from the insulating washers is enclosed by insulation shields of a uniform thickness to provide the dielectric separation of a capacitor.

In the first embodiment of the present invention, the center conductor of the probe is longitudinally disposed in a concentric relationship in a compression plug. Intermediate the ends the center conductor is undercut to form a circumferential groove into which the corresponding shoulders of the shoulder washer are swaged. In this manner one continual structure is formed comprising a cylindrical conductor extending from either side of a disc or shoulder washer. The shoulder washer is sandwiched between two insulating washers compressed between a gland fitting and a compression plug. The outboard ends of the two cylindrical conductors are enclosed in Teflon insulation both to separate the upper end of the conductor from the fitting and to provide a dielectric of known strength and dimension which separates the lower end of the conductor from the liquid. The gland fitting includes a cylindrical cavity formed central therewith for receiving the shielded probe, said cavity being tapered inwardly at the distal end to a diameter conforming with the diameter of the shield. A Teflon seal, conformed to mate in wedged relationship on the exterior thereof with the tapered surface of the central cavity, forms an annulus shaped on the interior to the dimensions of the probe shield. The insulating washer at the bottom end of the shoulder washer presses down across a retainer onto the seal to expand the seal to fill voids and imperfections. On the other side, the compression plug is similarly formed to receive a second Teflon seal wedged into sealing engagement upon compression by the second insulating washer against the insulating shield around the conductor. Thus, upon assembly, the compression plug is inserted into the gland fitting being pressed into position to compress the respective Teflon seals to fill all voids and cavities around both conductors. The insulator around the lower end of the conductor is formed to receive a metal bushing or sleeve conformed to mate with the conductor extending downwardly to a point where the wedging engagement of the seal is made.

In another embodiment of the present invention, the center conductor is similarly joined to a shoulder washer, being compressed into position in a compression plug by a retainer. The compression plug on the lower end thereof is turned to a smaller exterior diameter, forming circumferential grooves on the exterior on which a fluorinated ethylene propylene, or FEP, sleeve is positioned. A Teflon wedge seal formed to receive the sleeve on the interior thereof is bonded to the sleeve by heat after assembly. Thus, the compression fitting makes a permanent bond with the Teflon wedge seal which is then received into a gland fitting being compressed during assembly to a predetermined level of compression.

DESCRIPTION OF THE PREFERRED EMBODIMENTS

Figure 1:
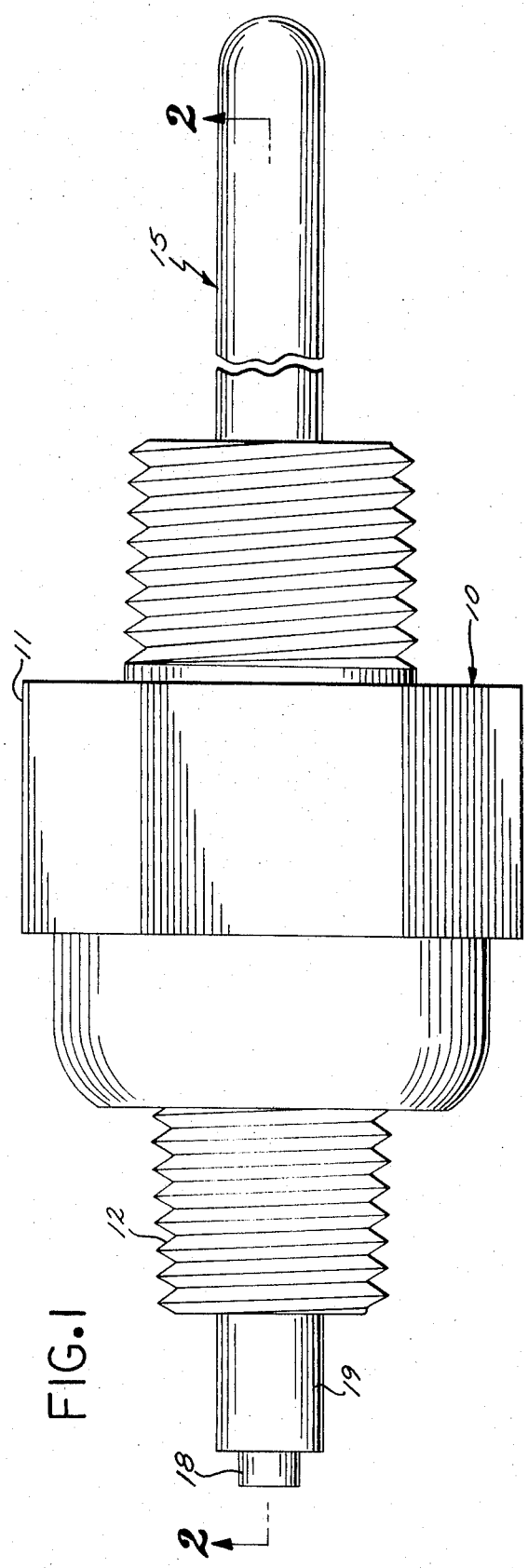
FIG. 1 is a side view of a capacitance probe constructed according to the present invention.
Figure 2:
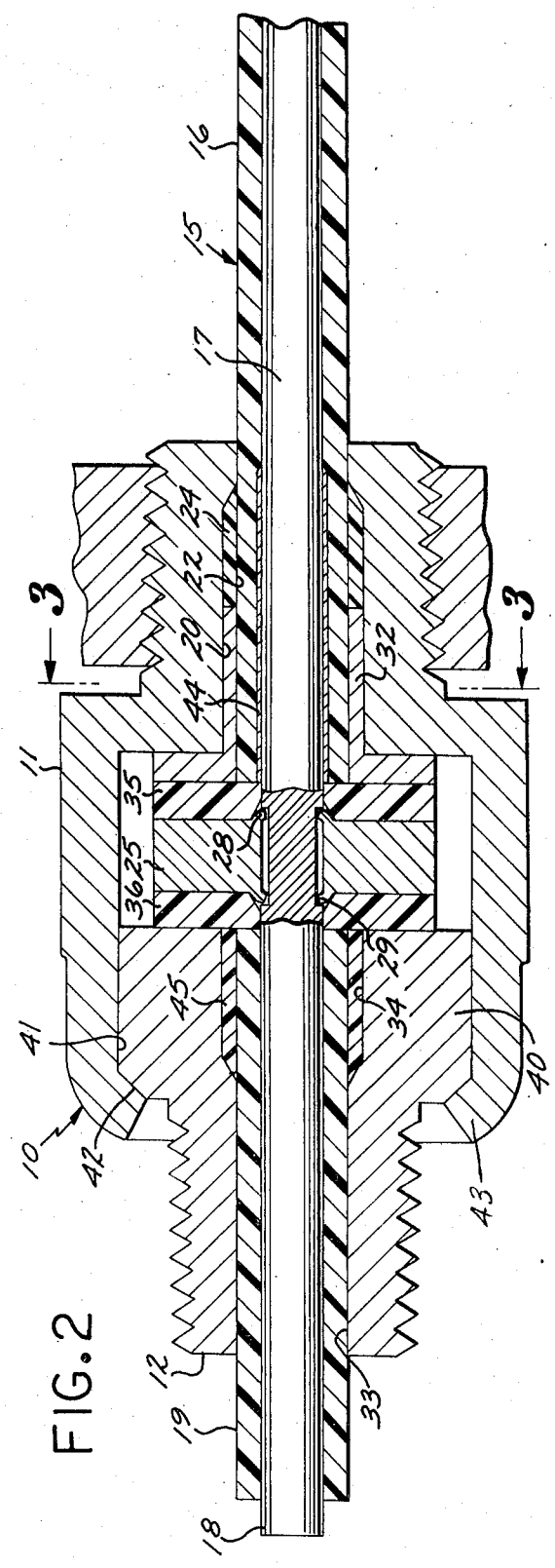
FIG. 2 is a cross-sectional view of a first embodiment of the capacitance probe taken along lines 2—2 of FIG. 1.
Figure 3:
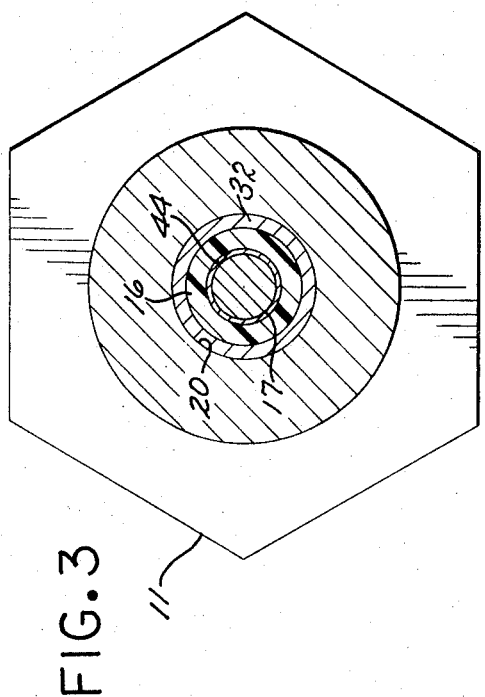
FIG. 3 is a cross-sectional view taken along lines 3—3 of FIG. 2.

As shown in FIGS. 1, 2 and 3, a first embodiment of the capacitance probe of the present invention, generally designated 10, includes a gland fitting 11 threaded at the bottom end for insertion into a threaded port in the wall of a liquid containing container. A compression plug 12 is pressed into the top end of fitting 11 in coaxial alignment therewith. Protruding axially from the bottom end of the fitting 11 is a tubular capacitance probe 15 comprising a lower end 17 of a center conductor enclosed in a shield 16 of dielectric material such as Teflon. On the distally opposing end of adaptor 10, the compression plug 12 contains an upper end 18 of the center conductor again enclosed by a dielectric shield 19 to insulate the upper end 18 from the walls of the plug 12. Thus the adaptor may be mounted in the wall of the aforementioned container and a measurement circuit (not shown) will be formed by the wall of such container, the liquid contained therein, across the dielectric shield to the center conductor of probe 15 and finally through the lower end 17 of the center conductor back up to the upper end 18. As the level of the liquid changes, the effective capacitance plate formed by the liquid will change to cause the measurement circuit to control measurement equipment accordingly.

The gland fitting 11 is formed at the lower end thereof to include a cylindrical cavity 20 axial with probe 15, the cavity 20 being tapered over a section adjacent the lower end of the fitting 11 to a diameter conforming with the external diameter of probe 15. Thus the cylindrical wall of cavity 20 cooperates with the probe 15 to form an annular space into which a lower tubular wedge seal 24, formed of a deformable material like Teflon, is insertable. The wedge seal 24, on the exterior, is conformed to mate with the cylindrical wall of cavity 20 and is formed with an interior cavity 22 receiving the upper extremity of the probe 15. The lower and upper sections 17 and 18 of the center conductor are joined at the adjacent ends across a circumferential groove 29, being inserted into the center opening of a disc or shoulder washer 25, to permit swaging of annular shoulders 28 formed on the shoulder washer into groove 29. The shoulder washer 25 is further sandwiched between insulative washers 35 and 36, each washer respectively interposing between the adjacent ends of shields 16 and 19 and washer 25. Thus the upper section 18 is assembled in substantially axial alignment with the lower section 17 forming a subassembly including the insulative shields 16 and 19, insulative washers 35 and 36 and the shoulder washer 25. This subassembly is aligned for insertion with the elements forming the probe 15 thereof extending through the cavity 20 of the fitting 11. Interposed between the washer 35 and the wedge seal 24 is a retainer 32 also extending into the cavity 20, whereby the seal 24 is compressed upon compression of washer 36. At the upper end the fitting 11 forms a receiving cavity 41 axially aligned with the cavity 20 and of a diameter conformed to provide a press fit with the exterior of an enlarged-in-diameter retaining ring 40 formed on the plug 12, such ring being formed at its top extremity with an annular tapered peripheral retaining shoulder 42. The tubular wall of the fitting 11 projects upwardly beyond the ring 40 and is swaged radially inwardly to form a retaining skirt 43 engaged against such retaining shoulder 42. The plug 12 further includes a central bore 33 aligned on insertion with the cavity 20 for receiving the upper insulative shield 19. Proximate the washer 36 bore 33 is tapered to a larger diameter bore 34 cooperating with the shield 19 to form an upper annular cavity for receiving an upper tubular wedge seal 45 similar to the seal 24.

Probe 15 further includes a metal sleeve 44 telescoped between the lower shield 16 and the lower section 17 and extending from the washer 35 to a point proximate the wedging contact of the seal 24. The sleeve 44 further increases the bearing surface of shield 16 to reduce any deformation thereof, thereby assuring sealing contact following assembly.

In operation the proximate ends of respective center conductor sections 18 and 17 are connected across shoulder washer 25 and are themselves received respectively in compression between the plug 12 and gland fitting 11. Upon assembly, the shoulder washer 25 is axially compressed between insulating washers 35 and 36 as the plug 12 is forced into the fitting 11 to provide a positive structural interface for transferring stresses to the fitting while the press fit and swaging assures continued compression of the shoulder washer following assembly. Furthermore, the assembly provides compressive forces to seal 45 and 24 for sealing against the cooperating surfaces. In this manner a capacitance probe is formed wherein all probe axial stresses are transmitted to the gland fitting 11 through the shoulder washer 25 and the insulating washers, while at the same time the respective wedge seals are compressed to fill all voids. The metal sleeve, insertable into the dielectric shield 16 proximate the upper end of conductor 17, further insures a positive sealing contact of seal 24 while distributing lateral loads over a wider area.

Figure 5:
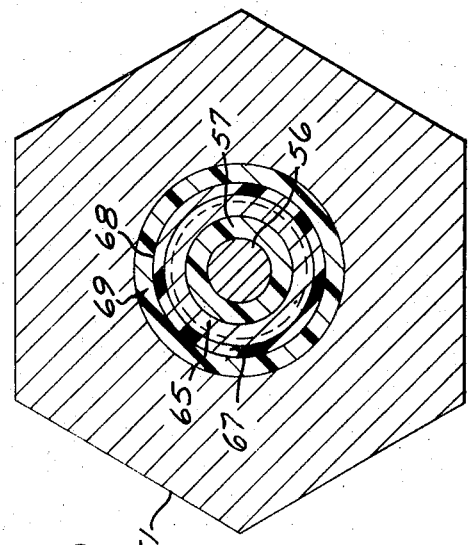
FIG. 5 is a cross-sectional view taken along lines 5—5 of FIG. 4.
Figure 4:
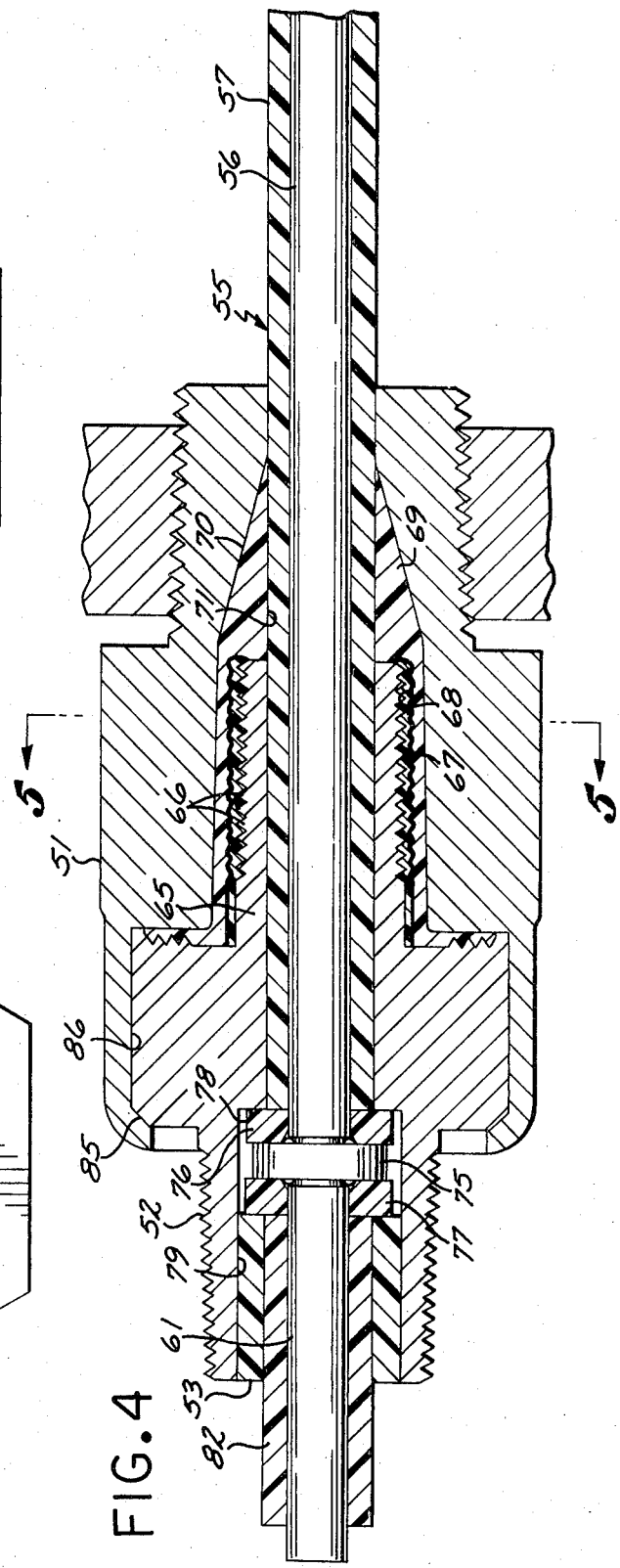
FIG. 4 is a cross-sectional view of yet another embodiment of a capacitance probe constructed according to the present invention.

Yet another embodiment of the present invention is shown in FIGS. 4 and 5, where, similar to the first embodiment, a gland fitting 51 receives a compression plug 52 in press fit mating engagement. The compression plug 52 at the upper end thereof further receives a retainer 53, also in press fit with the plug 52. Similar to the first embodiment, a probe 55 extends from the bottom end of gland fitting 51 comprising a lower section 56 of a center conductor enclosed by an insulating shield 57. At the upper end, an upper section 61 extends from the retainer 53 and is insulated therefrom by an insulator shield 82. Thus, in a similar fashion, a capacitor is formed by the liquid in the container and the probe 55, whereby changes in the level of liquid are registered as changes in effective plate area which are then interpreted or measured by any conventional capacitance measurement device.

Compression plug 52, at the lower end thereof, is shaped to form a smaller diameter cylindrical extension 65, grooved on the outer surfaces by grooves 66 to provide a positive bonding surface. An FEP, or fluorinated ethylene propylene, sleeve 67 is placed in surrounding relationship on grooves 66, interposing between the grooves and a central cavity 68 of a wedge seal 69 shaped on the interior thereof to receive the exterior diameter of the FEP sleeve. On the exterior the wedge seal 69 forms a tapered surface 70 proximate the lower end thereof, terminating at the interior surface of a central cavity 71 formed to mate with shield 57. In a similar manner, probe 56 connects in swaged engagement to a shoulder washer 75 inserted between two insulative washers 76 and 77 and is compressed between an annular shoulder 78 formed in compression plug 52 at the lower end of a central cavity 79 and the retainer 53. Upon assembly the seal 69 and the FEP sleeve 67 are heated to approximately 700°F at which point melting begins to occur and the FEP sleeve simultaneously shrinks to conform with the exterior of the compression fitting, while making a bond with seal 69.

The upper side of shoulder washer 75 receives, in similar swaged engagement, an upper section 61 of the center conductor enclosed in an insulative shield 82. The central cavity of retainer 53 is conformed to receive shield 82, the exterior surfaces thereof being shaped to form a press fit with the cavity 79 of plug 52. The upper exterior surface of plug 52 is also tapered to form a swaging surface 85 against which the skirt surrounding a central opening 86 of fitting 51 is swaged after assembly, the cooperating exterior surface of plug 52 and the mating opening 86 of fitting 51 forming a press fit.

In operation, the probe in the second embodiment is retained axially and radially by the retainer 53 inserted in the cooperating cavity in plug 52. Since the assembly procedure does not call for rotary installation, all of the seal deformation that will occur occurs axially. In this embodiment, the compression during and after assembly of the plug in the fitting provides sealing between the wedge seal and the cooperating wedge surface in the gland fitting, while the interior thereof is sealed by heat or bonding. Thus the primary seal is formed by the wedging action between the wedge seal and the gland fitting and the load transfer is transferred directly into the plug through the shoulder washer and the retainer.

Some of the many advantages of the present invention should now be readily apparent. The invention provides for a method of assembly which utilizes the wedging action of a wedge seal to best advantage and which furthermore reduces any secondary effects of cold flow created during rotary assembly. Also, the invention provides a positive load transfer path for transferring axial and radial loads from the probe through the gland fitting directly into the wall of the container.

Obviously many modifications and variations are possible in the light of the above teachings. It is therefore intended that the scope of the invention be determined by the appended claims.

What is claimed is:

1. A capacitance probe assembly for insertion into a sealed container, comprising:

disc means;

a center conductor passing through said disc means and extending substantially normal therefrom, said disc means surrounding a central portion of said conductor;

a gland fitting including a first central opening receiving an end of said center conductor;

deformable insulator means enclosing said end of said center conductor for providing insulation interspaced between said gland fitting and said center conductor;

compression means axially receiving internally thereof the other end of said center conductor, said compression means being in turn axially received in press fit engagement in said gland fitting to a preselected level of compression;

insulative washer means interspaced between said disc means and said gland fitting and between said disc means and said compression means for electrically insulating and transferring compressive and shear forces therethrough; and sealing means operatively connected for compression to said compression means and interposed in said first central opening between said gland fitting and said insulator means for deforming therebetween and closing leakage paths thereacross.

2. A capacitance probe according to claim 1 wherein:

said ends of said center conductor join across a reduced diameter section forming a peripheral groove; and said disc means is a shoulder washer having a central opening receiving said reduced diameter section of said center conductor, said opening being surrounded by shoulders formed on the surfaces of said washer swaged into said peripheral groove.

3. A capacitance probe according to claim 2 wherein:

said gland fitting further includes a second central opening formed in one end thereof in substantial axial alignment with said first central opening, said second central opening being received in press fit engagement with said compression means; and said first central opening includes a first tapered section converging to conform with the outside dimensions of said insulator means proximate the other end of said gland fitting.

4. A capacitance probe according to claim 3, wherein:

said sealing means includes a substantially annular seal of deformable insulative material shaped to conform on the exterior thereof with said tapered section of said first central opening and conforming on the interior thereof with said insulator means.

5. A capacitance probe according to claim 4, further including:

a retainer interposed between said insulative washer means and said annular seal.

6. A capacitance probe assembly for insertion into a sealed container, comprising:

disc means;

a center conductor passing through said disc means and extending substantially normal therefrom, said disc means surrounding a central portion of said conductor;

compression means axially receiving one end of said center conductor within one end thereof and extending to surround on the other end thereof said disc means and the other end of said center conductor;

a tubular retainer interspaced between said other end of said conductor and said compression means conformed on the exterior thereof for press fit engagement with said compression means;

a gland fitting including a first central opening axially receiving said one end of said conductor and said one end of said compression means;

deformable insulator means enclosing said one end of said center conductor for providing insulation interspaced between said center conductor, said gland fitting and said compression means;

insulative washer means interspaced between said disc means and said tubular retainer and between said disc means and said compression means for electrically insulating and transferring compressive and shear forces therethrough; and sealing means operatively connected for compression to said compression means and interposed in said first central opening between said gland fitting and said insulator means for deforming therebetween and closing leakage paths thereacross.

7. A capacitance probe according to claim 6, wherein:

said compression means includes a central cylindrical extension forming a central cavity receiving said insulative means on the interior thereof and having peripheral grooves on the exterior thereof; and said sealing means includes a deformable annular seal bonded on the interior thereof to the grooves exterior of said central cylindrical extension and formed on the exterior thereof to conform with said central opening.

8. A capacitance probe according to claim 7, wherein:

said annular seal includes a tapered section extending distal of said compression means at a taper converging to the exterior dimensions of said insulator means.

9. A capacitance probe according to claim 8, wherein:

said deformable annular seal includes a sleeve consisting of fluorinated ethylene propylene bonded to said grooves exterior of said cylindrical extension.

10. A capacitance probe according to claim 9 wherein:

said compression means includes a peripheral flange tapered to a conical annular surface on the upper exterior periphery thereof for engaging the upper edge of said gland fitting.

* * * * *